(12) United States Patent
Shin et al.

(10) Patent No.: US 9,759,959 B2
(45) Date of Patent: Sep. 12, 2017

(54) LIQUID CRYSTAL DISPLAY

(71) Applicant: SAMSUNG DISPLAY CO., LTD., Yongin, Gyeonggi-Do (KR)

(72) Inventors: Dong-Chul Shin, Seoul (KR); Oh Jeong Kwon, Hwaseong-si (KR); Heung Shik Park, Seoul (KR); Sung-Jae Yun, Hwaseong-si (KR); Su Jin Kim, Seoul (KR); Jae Hong Park, Seoul (KR); Ki Chul Shin, Seongnam-si (KR); Joo Young Yoon, Suwon-si (KR); Hyeok Jin Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 14/641,198

(22) Filed: Mar. 6, 2015

(65) Prior Publication Data
US 2015/0268518 A1 Sep. 24, 2015

(30) Foreign Application Priority Data
Mar. 21, 2014 (KR) .................. 10-2014-0033642

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/13373* (2013.01); *G02F 2001/134345* (2013.01)

(58) Field of Classification Search
CPC ......... G02F 1/134309; G02F 1/133707; G02F 1/133753; G02F 2001/13373;
(Continued)

(56) References Cited

U.S. PATENT DOCUMENTS 7,973,901 B2 * 7/2011 Yoo .................. G02F 1/134336
349/143
7,999,879 B2 * 8/2011 Yoshida ............ G02F 1/134363
349/129

(Continued)

FOREIGN PATENT DOCUMENTS

KR 10-2010-0048706 5/2010

*Primary Examiner* — Angela Davison
(74) *Attorney, Agent, or Firm* — Lewis Roca Rothgerber Christie LLP

(57) ABSTRACT

A liquid crystal display including a first substrate, a pixel electrode on the first substrate and including a first subpixel electrode and a second subpixel electrode separated from each other and located in one pixel area, a second substrate facing the first substrate, a common electrode on the second substrate, and a liquid crystal layer between the first substrate and the second substrate, wherein a first voltage applied to the first subpixel electrode is higher than a second voltage applied to the second subpixel electrode, wherein the first subpixel electrode includes first branch electrodes, the second subpixel electrode includes second branch electrodes, the second subpixel electrode is located around the pixel area to enclose the first subpixel electrode, wherein the first branch electrodes and the second branch electrodes face each other in a boundary portion of the first subpixel electrode and the second subpixel electrode.

13 Claims, 19 Drawing Sheets

(58) Field of Classification Search
CPC ........ G02F 2001/134345; G02F 2001/133757;
G02F 2001/133776; G02F 2201/123;
G02F 2201/124
USPC .................................................. 349/141, 144
See application file for complete search history.

(56) References Cited

U.S. PATENT DOCUMENTS

| | | | |
|---|---|---|---|
| 8,279,385 B2* | 10/2012 | Kim | .................. G02F 1/134309 |
| | | | 349/129 |
| 2004/0227884 A1 | 11/2004 | Wu et al. | |
| 2011/0157537 A1* | 6/2011 | Chen | .................. G02F 1/133707 |
| | | | 349/158 |
| 2013/0033668 A1 | 2/2013 | Yao et al. | |

* cited by examiner

31c (a)     (b)     (c)

(a)      (b)      (c)

(a)          (b)          (c)

(a)  (b)  (c)

LIQUID CRYSTAL DISPLAY

CROSS-REFERENCE TO RELATED APPLICATION

This application claims priority to and the benefit of Korean Patent Application No. 10-2014-0033642, filed in the Korean Intellectual Property Office on Mar. 21, 2014, the entire content of which is incorporated herein by reference.

BACKGROUND

1. Field

Aspects of one or more embodiments of the present invention relate to a liquid crystal display.

2. Description of the Related Art

A liquid crystal display (as one of flat panel display devices that are widely being used) includes two display panels where field generating electrodes (such as a pixel electrode or a common electrode) are formed, and a liquid crystal layer interposed therebetween.

The liquid crystal display generates an electric field in a liquid crystal layer by applying a voltage to the field generating electrodes, to determine orientations of liquid crystal molecules of the liquid crystal layer and control polarization of incident light, thereby displaying an image.

The liquid crystal display also includes switching elements connected to the respective pixel electrodes, and a plurality of signal lines such as gate lines and data lines for controlling them by applying voltages to the pixel electrodes.

Among these LCDs, a vertical alignment mode LCD, which arranges major axes of liquid crystal molecules so as to be substantially perpendicular to the display panel in a state in which an electric field is not applied, has been widely used due to its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two subpixels and applying different voltages to the two subpixels has been suggested.

However, when approximating the side visibility to the front visibility by dividing one pixel into two subpixels and forming different transmittances, the transmittance is decreased by an irregular movement of the liquid crystal molecules located between two subpixels.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a liquid crystal display for reducing (e.g., preventing) transmittance deterioration by reducing (e.g., preventing) an irregular movement of liquid crystal molecules while approximating (matching) side visibility to front visibility.

According to an embodiment of the present invention, there is provided a liquid crystal display including: a first substrate; a pixel electrode on the first substrate and including a first subpixel electrode and a second subpixel electrode separated from each other and located in one pixel area; a second substrate facing the first substrate; a common electrode on the second substrate; and a liquid crystal layer between the first substrate and the second substrate, wherein a first voltage applied to the first subpixel electrode is higher than a second voltage applied to the second subpixel electrode, wherein the first subpixel electrode includes a plurality of first branch electrodes, the second subpixel electrode includes a plurality of second branch electrodes, the second subpixel electrode is located around the pixel area to enclose the first subpixel electrode, wherein the plurality of first branch electrodes and the plurality of second branch electrodes face each other in a boundary portion of the first subpixel electrode and the second subpixel electrode, wherein, in the boundary portion, the plurality of first branch electrodes include a third branch electrode protruding toward the first branch electrode and a fourth branch electrode not protruded toward the first branch electrode, and wherein, in the boundary portion, the plurality of second branch electrodes include a fifth branch electrode not protruded toward the second branch electrode and a sixth branch electrode protruding toward the second branch electrode.

In an embodiment, the third branch electrode faces the fifth branch electrode, and the fourth branch electrode faces the sixth branch electrode.

In an embodiment, the third branch electrode and the fourth branch electrode are alternately arranged, and the fifth branch electrode and the sixth branch electrode are alternately arranged.

In an embodiment, the third branch electrode and the fourth branch electrode are alternately arranged one by one, and the fifth branch electrode and the sixth branch electrode are alternately arranged one by one.

In an embodiment, the first voltage is higher than the second voltage, the shape of the first subpixel electrode is a polygonal, and the shape of the second subpixel electrode includes four polygons enclosing the first subpixel electrode.

In an embodiment, the polygonal shape is a hexagon.

In an embodiment, the first subpixel electrode further includes a cross stem including a transverse stem and a longitudinal stem; and the plurality of first branch electrodes extend in four different directions from the cross stem.

In an embodiment, the second subpixel electrode further includes an outer stem located around the pixel area, and the plurality of second branch electrodes extend in four different directions from the outer stem.

In an embodiment, the third branch electrode and the fourth branch electrode are alternately arranged in twos or more, and the fifth branch electrode and the sixth branch electrode are alternately arranged in twos or more.

In an embodiment, the first voltage is higher than the second voltage, the shape of the first subpixel electrode is a polygonal shape, and the second subpixel electrode includes four polygons enclosing the first subpixel electrode.

In an embodiment, the polygonal shape is a hexagon.

In an embodiment, the first subpixel electrode further includes a cross stem including a transverse stem and a longitudinal stem; and the plurality of first branch electrodes extend in four different directions from the cross stem.

In an embodiment, the second subpixel electrode further includes an outer stem located around the pixel area; and the plurality of second branch electrodes extend in four different directions from the outer stem.

According to an example embodiment of the present invention, while approximating (matching) side visibility to front visibility, irregular movement of the liquid crystal

DETAILED DESCRIPTION

Figure 1:
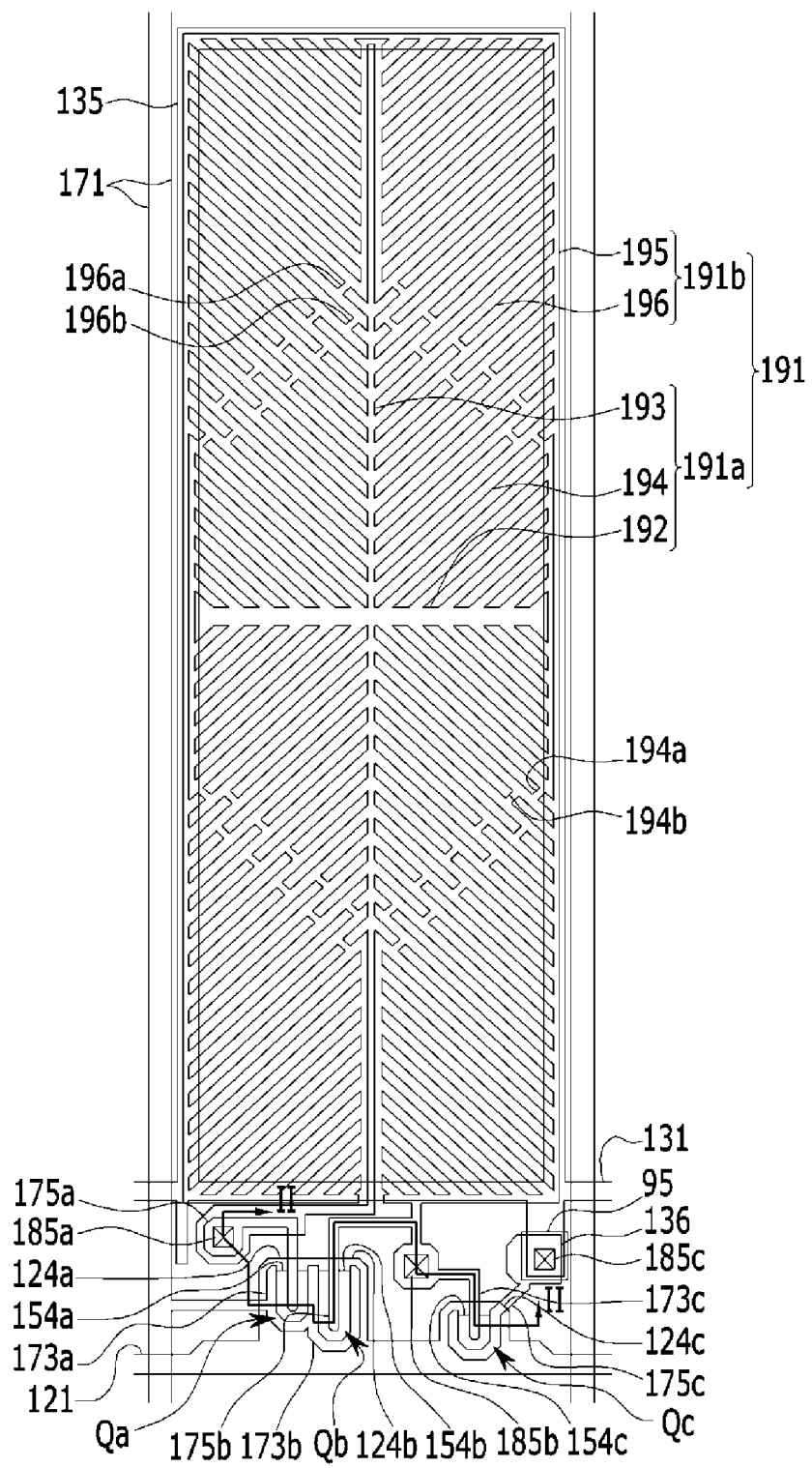
FIG. 1 is a layout view of a liquid crystal display, according to an example embodiment of the present invention.

Example embodiments of the present invention will be described in detail with reference to the attached drawings. The present invention may be modified in many different forms and should not be construed as being limited to the example embodiments set forth herein. Rather, the example embodiments of the present invention are provided so that this disclosure will be thorough and complete, and will fully convey the concept of the present invention to those skilled in the art.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. Like numbers refer to like elements throughout the specification.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. As used herein, the term "substantially," "about," and similar terms are used as terms of approximation and not as terms of degree, and are intended to account for the inherent deviations in measured or calculated values that would be recognized by those of ordinary skill in the art.

Now, a liquid crystal display according to an example embodiment of the present invention will be described with reference to FIG. 1 and FIG. 2. FIG. 1 is a layout view of a liquid crystal display, according to an example embodiment of the present invention, and FIG. 2 is a cross-sectional view of the liquid crystal display FIG. 1 taken along the line II-II.

Figure 2:
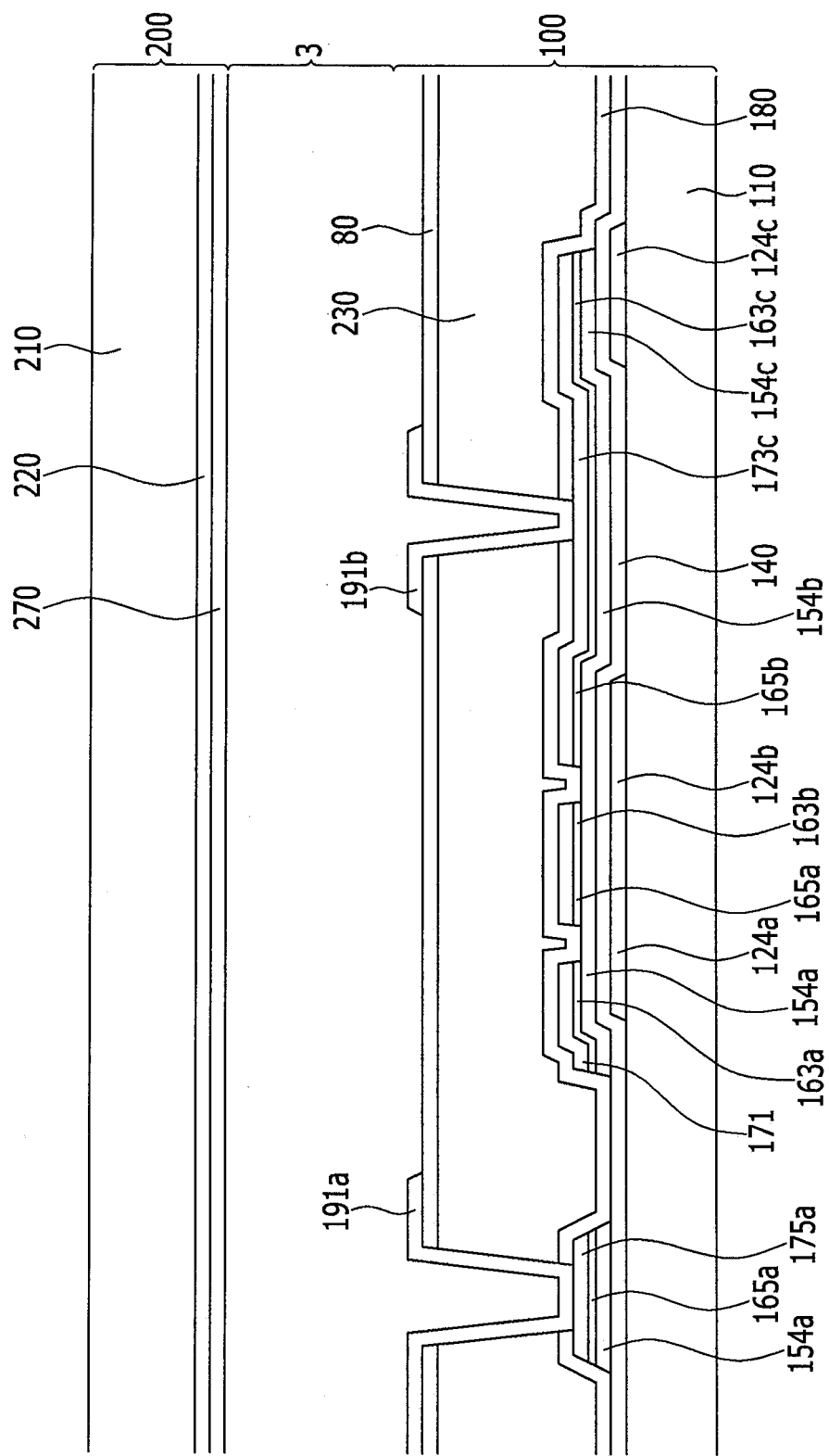
FIG. 2 is a cross-sectional view of the liquid crystal display FIG. 1 taken along the line II-II.

Firstly, referring to FIG. 1 and FIG. 2, a liquid crystal display, according to the present example embodiment, includes a lower panel 100 and an upper panel 200 facing each other, and a liquid crystal layer 3 interposed between the two display panels 100 and 200.

First, the lower panel 100 will be described.

A gate line 121, a reference voltage line 131, and a storage electrode 135 are formed on a first substrate 110 made of transparent glass or plastic. The gate line 121 transfers a gate signal and mainly extends in a transverse direction.

The gate line 121 includes a first gate electrode 124a, a second gate electrode 124b, a third gate electrode 124c, and a wide end for connection with other layers or an external driving circuit.

The reference voltage line 131 may extend in parallel to the gate line 121 and has an expansion 136, and the expansion 136 is coupled to a third drain electrode 175c that will be described later in more detail.

The reference voltage line 131 includes the storage electrode 135 enclosing a pixel area.

A gate insulating layer 140 is formed on the gate line 121, the reference voltage line 131, and the storage electrode 135.

A first semiconductor 154a, a second semiconductor 154b, and a third semiconductor 154c that may be made of amorphous silicon or crystalline silicon are located on the gate insulating layer 140.

A plurality of ohmic contacts 163a, 163b, 163c, 165a, and 165b are formed on the first semiconductor 154a, the second semiconductor 154b, and the third semiconductor 154c. When the semiconductors 154a, 154b, and 154c are formed with an oxide semiconductor, the ohmic contacts may be omitted.

Data conductors 171, 173a, 173b 173c, 175a, 175b, and 175c, which include a first source electrode 173a, a second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140.

The second drain electrode 175b is coupled to the third source electrode 173c.

The first gate electrode 124a, the first source electrode 173a, and the first drain electrode 175a form a first thin film transistor Qa along with the first semiconductor 154a, and a channel of the thin film transistor is formed in the semiconductor 154a between the first source electrode 173a and the first drain electrode 175a. Similarly, the second gate electrode 124b, the second source electrode 173b, and the second drain electrode 175b form a second thin film transistor Qb along with the second semiconductor 154b, and a channel of the thin film transistor is formed in the semiconductor 154b between the second source electrode 173b and the second drain electrode 175b. The third gate electrode 124c, the third source electrode 173c, and the third drain electrode 175c form a third thin film transistor Qc along with the third semiconductor Qc, and a channel of the thin film transistor is formed in the semiconductor 154c between the third source electrode 173c and the third drain electrode 175c.

A passivation layer 180 that may be made of an inorganic insulator such as a silicon nitride or a silicon oxide is formed on the data conductors 171, 173a, 173b, 173c, 175a, 175b, and 175c and exposed portions of the semiconductors 154a, 154b, and 154c.

A color filter 230 is located on the passivation layer 180.

A light blocking member may be located on a region where the color filter 230 is not located and on a portion of the color filter 230. The light blocking member is referred to as a black matrix and reduces (e.g., prevents) light leakage.

An overcoat (capping layer) 80 is located on the color filter 230. The overcoat 80 reduces (e.g., prevents) peeling of the color filter 230 and the light blocking member, and suppresses contamination of the liquid crystal layer 3 by an organic material of a solvent that inflows from the color filter 230, so that it reduces (e.g., prevents) defects such as afterimages that may occur when an image is driven.

A pixel electrode 191 including a first subpixel electrode 191a and a second subpixel electrode 191b that are separated from each other and a connecting member 95 are formed on the overcoat 80.

Referring to FIG. 1, an overall shape of the first subpixel electrode 191a is a polygonal shape such as a hexagon, and the first subpixel electrode 191a is surrounded by (e.g., enclosed by) the second subpixel electrode 191b. An overall shape of the second subpixel electrode 191b is a shape that includes four polygons surrounding the first subpixel electrode 191a, and is located at the edge of the pixel area.

The first subpixel electrode 191a includes a crossed-shape stem (192 and 193) including a transverse stem 192 and a longitudinal stem 193, and a plurality of first branch electrodes 194 extending from the crossed-shape stem (192 and 193). The first branch electrodes 194 extend in four different directions. In more detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191b includes an outer stem 195 enclosing the edge of the pixel area, and a plurality of second branch electrodes 196 extending from the outer stem 195. The second branch electrodes 196 extend in four different directions. In more detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

The portion of the first branch electrodes 194 and the portion of the second branch electrodes 196 face each other at a boundary portion of the first subpixel electrode 191a and the second subpixel electrode 191b.

The first branch electrodes 194 of the first branch electrodes 194 and second branch electrodes 196, which face each other at the boundary portion of the first subpixel electrode 191a and the second subpixel electrode 191b, include the third branch electrodes 194a having ends protruding toward the second branch electrodes 196, and the fourth branch electrodes 194b having ends that are not protruded, unlike the third branch electrodes 194a. Similarly, the second branch electrodes 196 include the fifth branch electrodes 196a having ends that are not protruded, unlike the first branch electrodes 194, and the sixth branch electrodes 196b having ends protruding toward the first branch electrodes 194, unlike the fifth branch electrodes 196a. That is, the first branch electrodes 194 and the second branch electrodes 196 facing each other at the boundary portion of the first subpixel electrode 191a and the second subpixel electrode 191b have a sawtooth engagement with each other.

The third branch electrodes 194a and the fourth branch electrodes 194b of the first branch electrodes 194 are alternately located one by one. For example, consecutive ones of the third branch electrodes 194a are separated by a corresponding one of the fourth branch electrodes 194b and/or consecutive ones of the fourth branch electrodes 194b are separated by a corresponding one of the third branch electrodes 194a. Similarly, the fifth branch electrodes 196a and the sixth branch electrodes 196b are alternately located one by one. For example, consecutive ones of the fifth branch electrodes 196a are separated by a corresponding one of the sixth branch electrodes 196b and/or consecutive ones of the sixth branch electrodes 196b are separated by a corresponding one of the fifth branch electrodes 196a. The third branch electrodes 194a of the first branch electrodes 194 face the fifth branch electrodes 196a of the second branch electrodes 196, and the fourth branch electrodes 194b of the first branch electrodes 194 face the sixth branch electrodes 196b of the second branch electrodes 196.

Accordingly, the ends of the first branch electrodes 194 and the second branch electrodes 196 facing each other at the boundary portion of the first subpixel electrode 191a and the second subpixel electrode 191b are not located in a straight line, and the portions located close to the side of the first branch electrodes 194 and the portions located close to the side of the second branch electrodes 196 are alternately located.

Therefore, by controlling the arrangement of the ends of the first branch electrodes 194 and the second branch electrodes 196, the irregular movement of the liquid crystal molecules generated at the boundary portion of the first subpixel electrode 191*a* and the second subpixel electrode 191*b* may be reduced (e.g., prevented), thereby reducing (e.g., preventing) the decreasing of the transmittance.

The passivation layer 180 and the overcoat 80 have a first contact opening (e.g., a first contact hole) 185*a* exposing a portion of the first drain electrode 175*a*, a second contact opening (e.g., a second contact hole) 185*b* exposing a portion of the second drain electrode 175*b*, and a third contact opening (e.g., a third contact hole) 185*c* exposing the third source electrode 173*c* and the expansion 136 of the reference voltage line 131.

The first subpixel electrode 191*a* is physically and electrically coupled to the first drain electrode 175*a* through the first contact opening 185*a*, and the second subpixel electrode 191*b* physically and electrically coupled to the second drain electrode 175*b* through the second contact opening 185*b*.

The first subpixel electrode 191*a* and the second subpixel electrode 191*b* respectively receive the data voltage from the first drain electrode 175*a* and the second drain electrode 175*b* through the first contact opening 185*a* and the second contact opening 185*b*.

The third source electrode 173*c* and the expansion 136 of the reference voltage line 131 exposed through the third contact opening 185*c* are coupled through the connecting member 95 such that the reference voltage is applied to the third source electrode 173*c*.

Next, the upper panel 200 will be described.

A light blocking member 220 and a common electrode 270 are formed on a second substrate 210 made of a transparent glass and/or plastic.

However, in a case of a liquid crystal display according to another example embodiment of the present invention, the light blocking member 220 may be located on the lower panel 100, and in a case of a liquid crystal display according to a further example embodiment, the color filter located in the upper panel 200 may be included.

Alignment layers may be formed on inner surfaces of the display panels 100 and 200, and they may be vertical alignment layers.

A polarizer may be provided on the outer surface of the two display panels 100 and 200, and, in one embodiment, transmissive axes of the two polarizers may be orthogonal to each other and that either transmissive axis is parallel to the gate line 121. However, the polarizer may only be located at one outer surface of the two display panels 100 and 200.

The liquid crystal layer 3 has negative dielectric anisotropy, and 31 of the liquid crystal layer 3 may be aligned so that long axes thereof are substantially perpendicular (normal) to the surface of the two display panels 100 and 200 in a state in which there is no electric field. Therefore, the incident light does not pass through the crossed polarizers but is blocked in a state in which there is no electric field.

At least one of the liquid crystal layer 3 and the alignment layer may include a photoreactive material, and in more detail, a reactive mesogen.

Figure 3A:
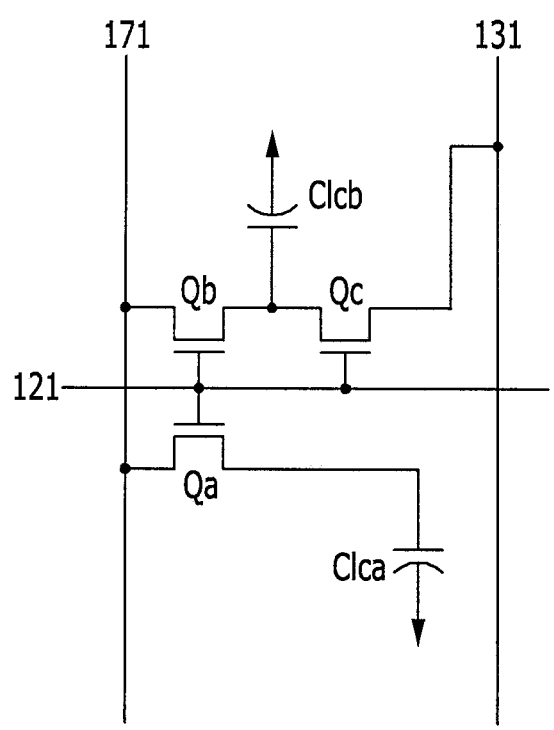
FIG. 3A is an equivalent circuit diagram of one pixel of a liquid crystal display, according to an example embodiment of the present invention.

Next, a driving method of a liquid crystal display according to the present example embodiment will be described with reference to FIG. 1 and FIG. 3A. FIG. 3A is an equivalent circuit diagram of one pixel of a liquid crystal display, according to an example embodiment of the present invention.

When the gate line 121 is applied with a gate-ON signal, the first gate electrode 124*a*, the second gate electrode 124*b*, and the third gate electrode 124*c* are applied with the gate-ON signal such that the first switching element Qa, the second switching element Qb, and the third switching element Qc are turned ON.

Accordingly, the data voltage applied to the data line 171 is applied to the first subpixel electrode 191*a* and the second subpixel electrode 191*b* through the turned-ON first switching element Qa and second switching element Qb. At this time, the first subpixel electrode 191*a* and the second subpixel electrode 191*b* are applied with a voltage of substantially the same magnitude (e.g., the same magnitude). However, the voltage applied to the second subpixel electrode 191*b* is divided through the third switching element Qc coupled in parallel to the second switching element Qb. Accordingly, the voltage applied to the second subpixel electrode 191*b* is lower than the voltage applied to the first subpixel electrode 191*a*.

Accordingly, charge voltages of a first liquid crystal capacitor formed between the first subpixel electrode 191*a* and the common electrode 270, and a second liquid crystal capacitor formed between the second subpixel electrode 191*b* and the common electrode 270, represent different gamma curves; and a gamma curve of one pixel voltage becomes a combination curve thereof. The combination gamma curve at the front may be substantially identical (e.g., identical) to a reference gamma curve at the front that is determined to be most appropriate, and the combination gamma curve at the side of the display is to be closest to the reference gamma curve at the front. As described above, the side visibility is improved by converting the image data.

Also, according to an example embodiment of the present invention, the second subpixel electrode 191*b* applied with a relatively low voltage encloses the first subpixel electrode 191*a* applied with a relatively high voltage and the second subpixel electrode 191*b* is located at the outer edge of the pixel area, thereby reducing unnecessary parasitic capacitance that may be generated by overlapping of the data line 171 and the pixel electrode 191. In more detail, because the parasitic capacitance is proportional to the voltage level of (e.g., the voltage difference between) the two overlapping electrodes, the parasitic capacitance generated when the first subpixel electrode 191*a* (which has the relatively high voltage applied to it) and the data line 171 overlap each other is smaller than the parasitic capacitance generated when the second subpixel electrode 191*b* (which has the relatively low voltage applied to it) and the data line 171 overlap each other. Therefore, according to an example embodiment of the present invention, because the data line 171 mainly overlaps the second subpixel electrode 191*b* located at the outer edge of the pixel area, compared with the case in which the first subpixel electrode 191*a* and the second subpixel electrode 191*b* overlap the data line 171 with the same area, the unnecessary parasitic capacitance that may be generated by the overlapping of the data line 171 and the pixel electrode 191 may be reduced. Because the unnecessary parasitic capacitance may be reduced, the size of the second subpixel electrode 191*b* may be relatively increased, and as a result, the transmittance of the liquid crystal display may be increased.

As described with reference to FIG. 3A, according to the present example embodiment, to differentiate the voltage charged to the first liquid crystal capacitor Clca coupled to the first subpixel electrode 191a and the voltage charged to the second liquid crystal capacitor Clcb coupled to the second subpixel electrode 191b, the output terminal of the second switching element Qb coupled to the second subpixel electrode 191b forming the second liquid crystal capacitor Clcb and the third switching element Qc coupled to the divided voltage reference voltage line 131 are included. However, according to another example embodiment of the present invention, the output terminal of the second switching element Qb coupled to the second subpixel electrode 191b forming the second liquid crystal capacitor Clcb and the third switching element Qc coupled to a step-down capacitor may be included. This will be described with reference to FIG. 3B.

Figure 3B:
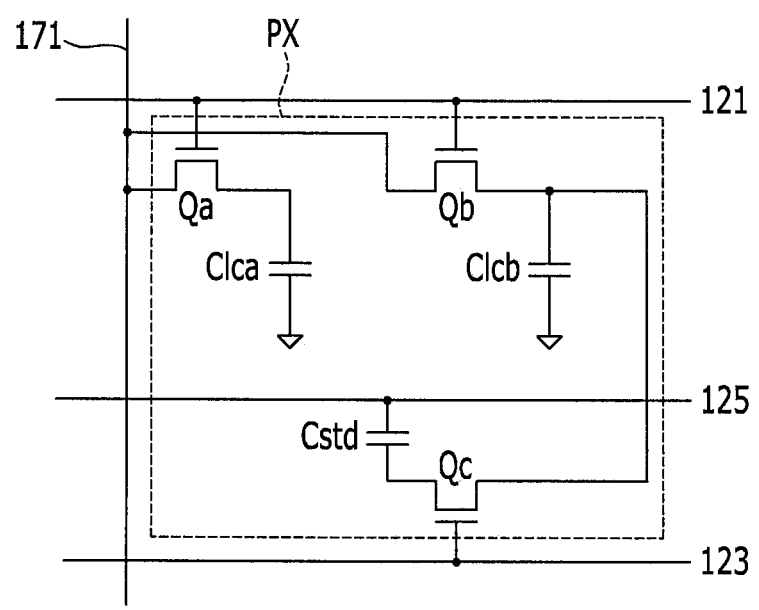
FIG. 3B is an equivalent circuit diagram of one pixel of a liquid crystal display, according to another example embodiment of the present invention.

Referring to FIG. 3B, the liquid crystal display, according to the current example embodiment of the present invention, may include the output terminal of the second switching element Qb coupled to the second subpixel electrode 191b forming the second liquid crystal capacitor Clcb and the third switching element Qc coupled to the step-down capacitor Cstd. In this example, the third switching element Qc may be coupled to a step-down gate line 123 different from the first switching element Qa and the second switching element Qb, and after the gate line 121 is applied with the gate-on signal such that the first switching element Qa and the second switching element Qb are turned ON then turned off, the step-down gate line 123 is applied with the gate-on signal such that the third switching element Qc may be turned ON. After the first switching element Qa and the second switching element Qb are turned ON then turned OFF, when the third switching element Qc is turned ON, the charge is moved from the second subpixel electrode 191b to the step-down capacitor Cstd through the third switching element Qc. Thus, the charged voltage of the second liquid crystal capacitor Clcb is decreased, and the step-down capacitor Cstd is charged. The charged voltage of the second liquid crystal capacitor Clcb is decreased by the capacitance of the step-down capacitor Cstd such that the charge voltage of the second liquid crystal capacitor Clcb is lower than the charge voltage of the first liquid crystal capacitor Clca. At this time, the difference of the charge voltage may be controlled by the size of the voltage applied to a second reference voltage line 125 coupled to the other terminal of the step-down capacitor Cstd.

Figure 3C:
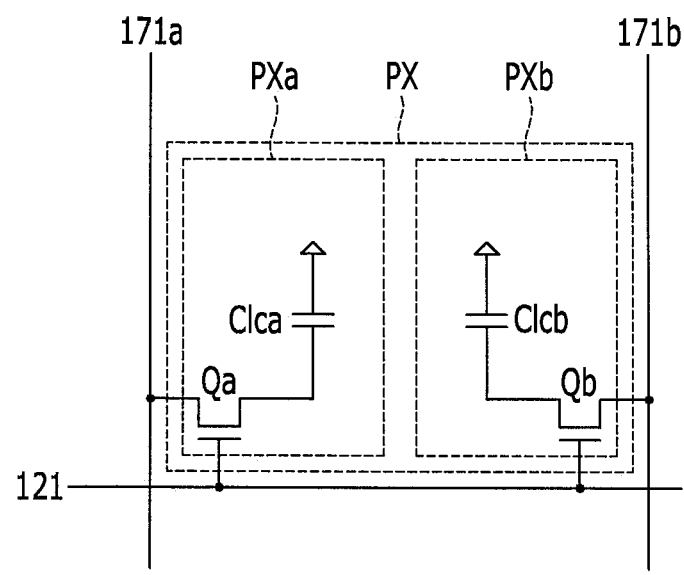
FIG. 3C is an equivalent circuit diagram of one pixel of a liquid crystal display, according to another example embodiment of the present invention.

Also, as shown in FIG. 3C, in the liquid crystal display, according to another example embodiment of the present invention, the first liquid crystal capacitor Clca and the second liquid crystal capacitor Clcb are respectively coupled to a different first data line 171a and a different second data line 171b to be applied with different data voltages, thereby differentiating the charge voltages of the first liquid crystal capacitor and the second liquid crystal capacitor.

The charge voltage of the first liquid crystal capacitor Clca and the second liquid crystal capacitor Clcb may be differentiated by various suitable methods.

On the other hand, as described above, at least one of the liquid crystal layer 3 and the alignment layer may include a photoreactive material, such as a reactive mesogen.

Figure 4:
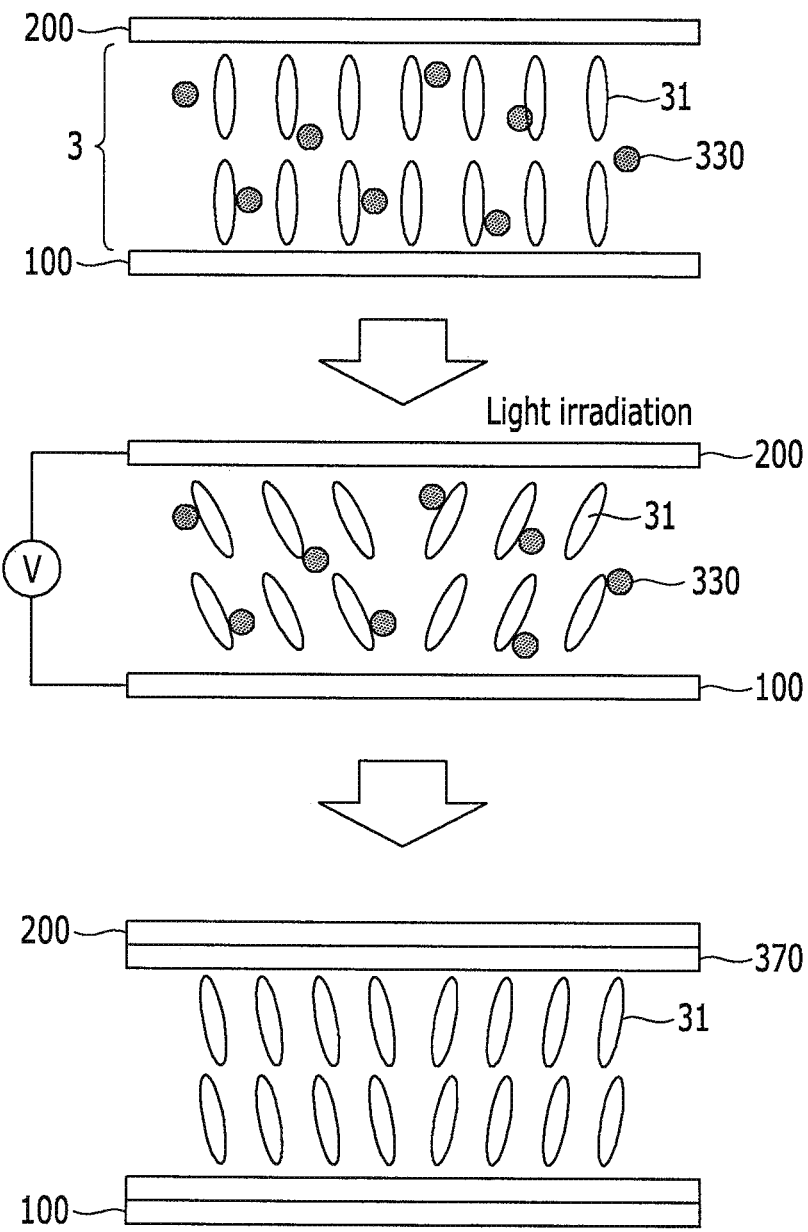
FIG. 4 is a view showing a process of providing a pretilt angle to liquid crystal molecules by using prepolymers polarized by light such as ultraviolet rays.

Next, an initial alignment method of providing the pretilt to the liquid crystal molecules of the liquid crystal layer will be described with reference to FIG. 4. FIG. 4 is a view showing a process for providing a pretilt to liquid crystal molecules 31 by using prepolymers that are polymerized by light such as ultraviolet rays.

Firstly, prepolymers 330 such as monomers, which are hardened through polymerization by light such as ultraviolet rays, are inserted between the two display panels 100 and 200 along with the liquid crystal material. The prepolymers 330 may include a reactive mesogen that is polymerized by light such as ultraviolet rays.

Next, through several methods, the first subpixel electrode 191a and the second subpixel electrode 191b have voltages of different magnitudes applied thereto, and the common electrode 270 of the upper panel 200 has the common voltage applied to it to generate the electric field at the liquid crystal layer 3 between the two display panels 100 and 200. Thus, in response to the electric field, the liquid crystal molecules 31 of the liquid crystal layer 3 are respectively inclined in four directions as a result of the fringe field due to the plurality of first branch electrodes 194 of the first subpixel electrode 191a and the common electrode 270, and the fringe field due to a plurality of second branch electrodes 196 of the second subpixel electrode 191b and the common electrode 270. The four directions may include the direction substantially parallel to the extending direction (e.g., lengthwise direction) of the first branch electrodes 194 of the first subpixel electrode 191a and the direction substantially parallel to the extending direction (e.g., lengthwise direction) of the second branch electrodes 196 of the second subpixel electrode 191b.

Because the first subpixel electrode 191a and the second subpixel electrode 191b are applied with the voltages of the different magnitudes, the inclination angles of the liquid crystal molecules 31 corresponding to the first subpixel electrode 191a and the liquid crystal molecules 31 corresponding to the second subpixel electrode 191b are different with reference to the first substrate 110.

After generating the electric field at the liquid crystal layer 3, when the light such as ultraviolet rays is irradiated, the prepolymers 330 are polymerized to form a polymer 370. The polymer 370 is formed while contacting the display panels 100 and 200. The alignment direction is determined for the liquid crystal molecules 31 to have the pretilt in the length direction of the minute branches by the polymer 370. Accordingly, the liquid crystal molecules 310 are arranged with the pretilts of four different directions under non-application of the voltage to the electrodes 191 and 270.

Figure 5:
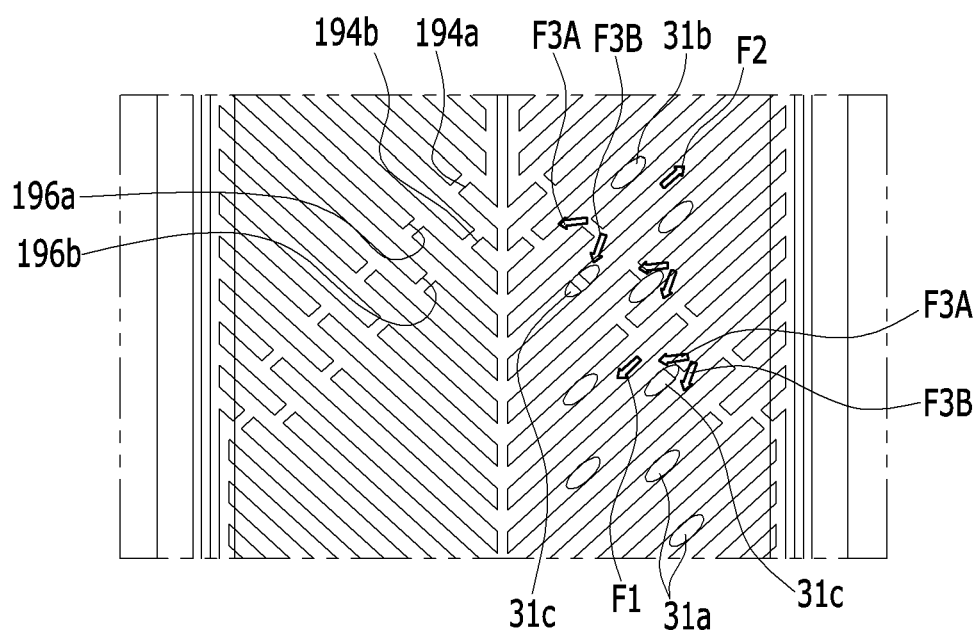
FIG. 5 is a schematic view of a movement of liquid crystal molecules of a liquid crystal display, according to an example embodiment of the present invention.

Next, the movement of the liquid crystal molecules of the liquid crystal display, according to an example embodiment of the present invention, will be described with reference to FIG. 6 to FIG. 9 as well as FIG. 5. FIG. 5 is a schematic view of movement of liquid crystal molecules of a liquid crystal display, according to an example embodiment of the present invention. FIG. 6 to FIG. 9 are views showing a direction of an electric field and a direction of liquid crystal molecules.

Referring to FIG. 5, the first subpixel electrode 191a and the second subpixel electrode 191b have voltages of different magnitudes applied thereto and the common electrode 270 of the upper panel 200 has the common voltage applied to it to generate the electric field at the liquid crystal layer 3 between the two display panels 100 and 200. At this time, first liquid crystal molecules 31a located near the first branch electrodes 194 are firstly inclined by the first fringe field F1 applied in the direction substantially perpendicular to the edge of the first branch electrodes 194, then collide with each other, and then are inclined in four directions, which are directions substantially parallel to the directions that the first branch electrodes 194 extend. Similarly, second liquid crystal molecules 31b located near the second branch electrodes 196 are firstly inclined by the second fringe field F2 applied in the direction substantially perpendicular to the edge of the second branch electrodes 196, then collide with each other, and then are inclined in four directions, which are directions substantially parallel to the directions that the second branch electrodes 196 extend.

Figure 6:
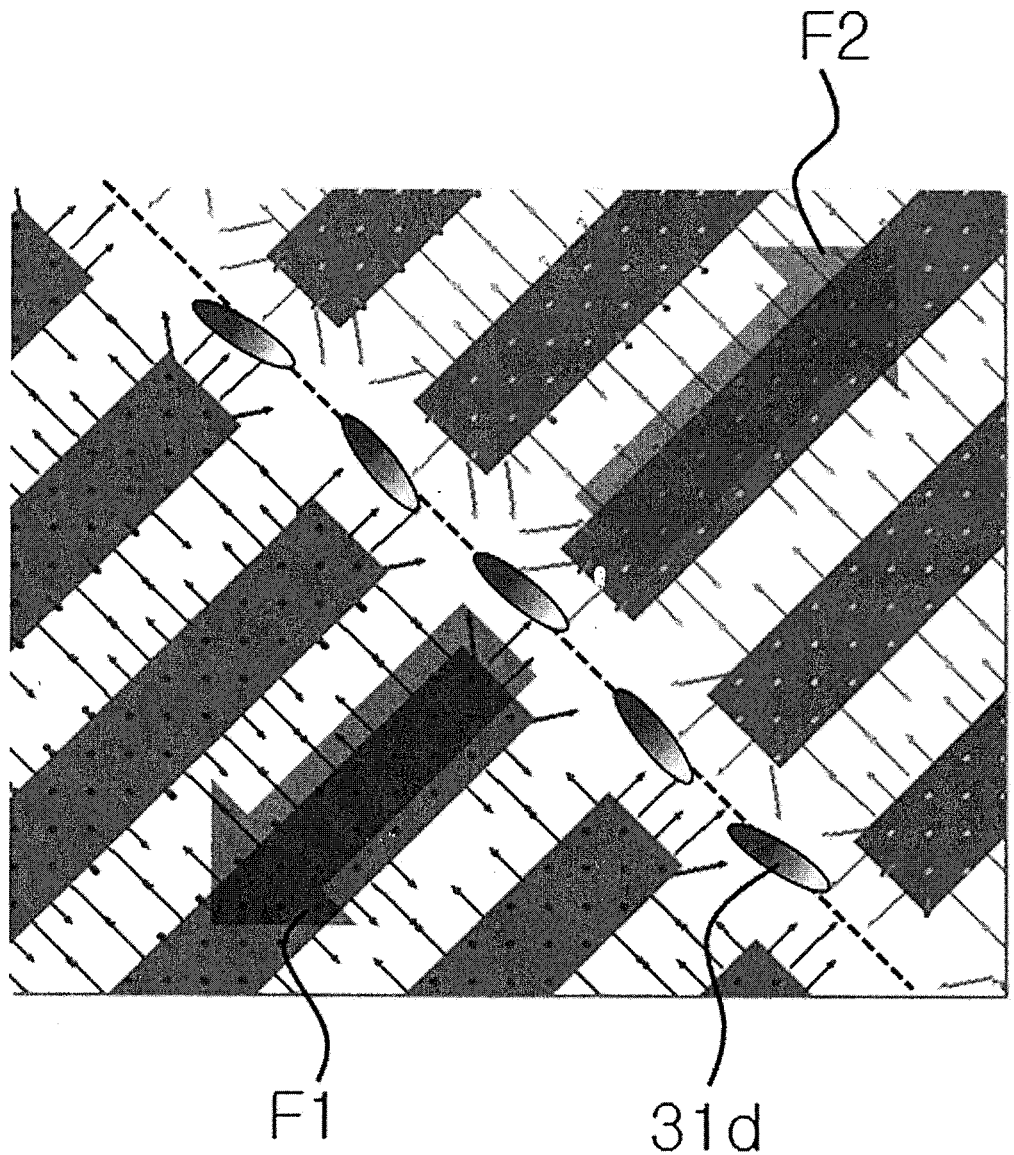
FIG. 6 to FIG. 9 are views showing a direction of an electric field and a director of liquid crystal molecules.
Figure 7:
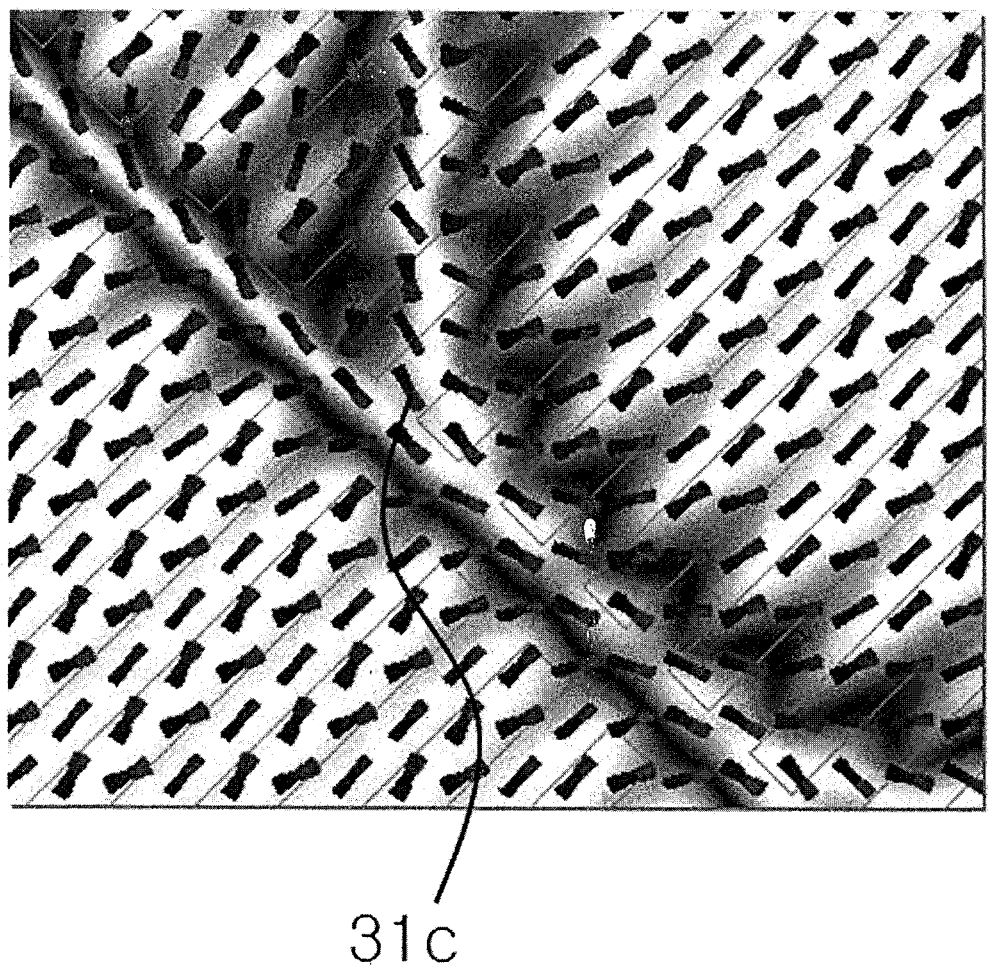

As shown in FIG. 6 and FIG. 7, according to the general liquid crystal display in which the edges of the first branch electrodes 194 and the second branch electrodes 196 are arranged in one line at the boundary portion between the first branch electrodes 194 and the second branch electrodes 196, the liquid crystal molecules 31*d* are inclined in the direction substantially perpendicular to the extending direction (e.g., lengthwise direction) of the first branch electrodes 194 and the second branch electrodes 196 by the fringe field applied in the direction substantially perpendicular to the edge of the ends of the first branch electrodes 194 and the second branch electrodes 196.

Figure 8:
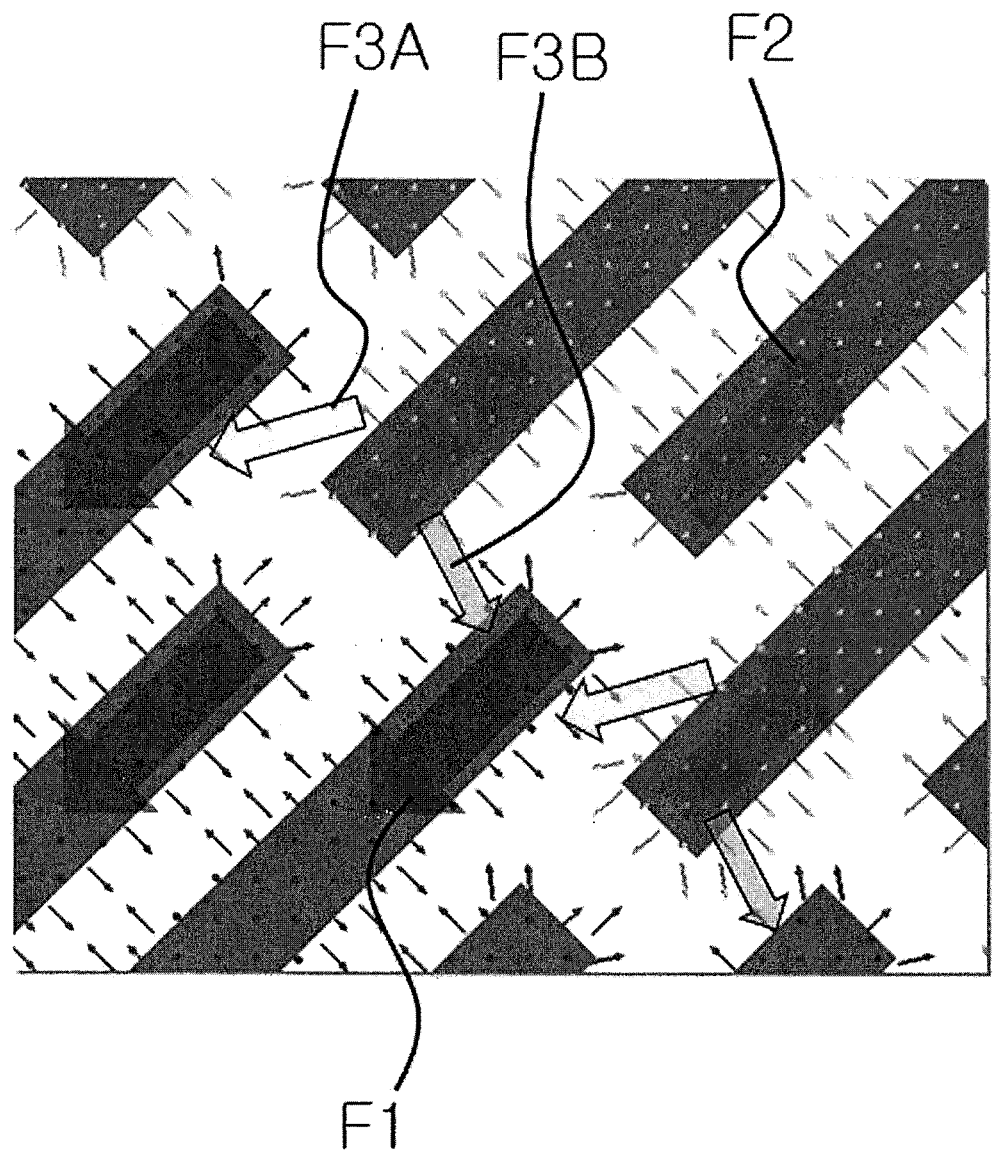
Figure 9:
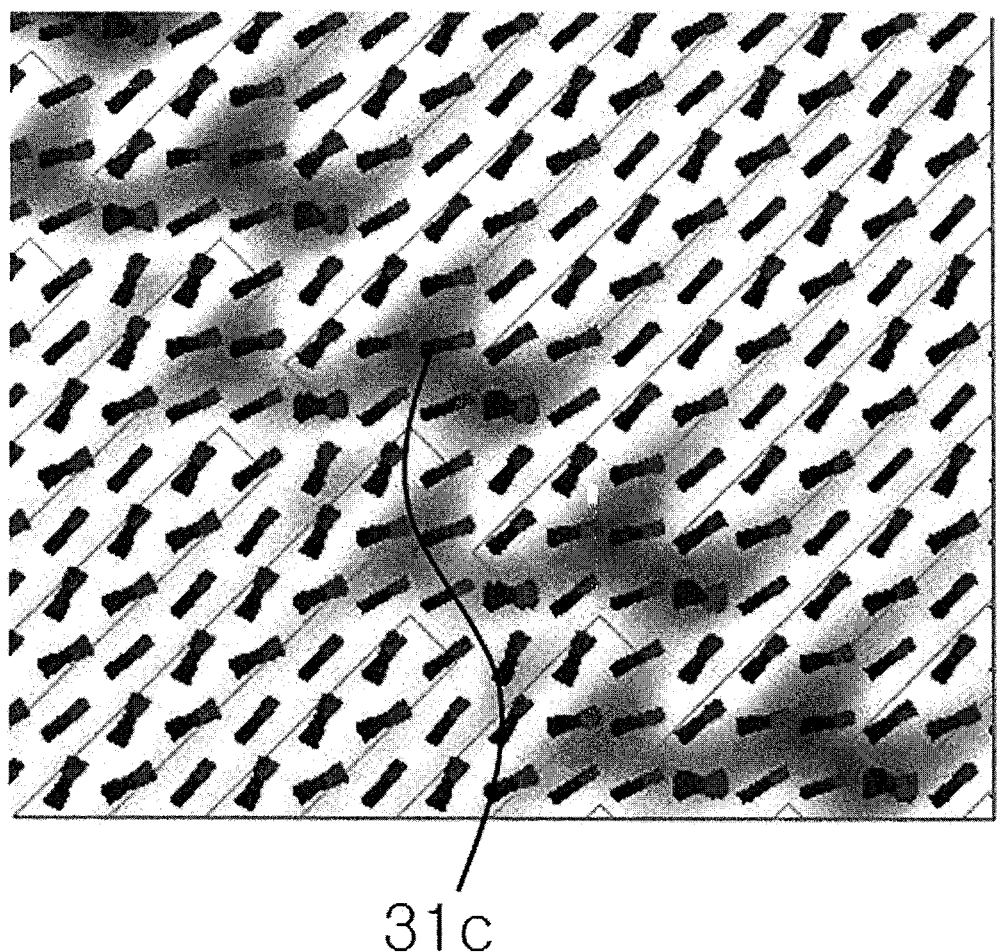

However, as shown in FIG. 8 and FIG. 9, according to an example embodiment of the present invention, third liquid crystal molecules 31*c* located at the boundary portion between the first branch electrodes 194 and the second branch electrodes 196 together receive an influence of a third fringe field F3A and a fourth third fringe field F3B applied between the ends of the first branch electrodes 194 and the ends of the second branch electrodes 196 adjacent thereto as well as the fringe field applied in the direction substantially perpendicular to the edge of the ends of the first branch electrodes 194 and the second branch electrodes 196. Thereby, they are inclined in the direction substantially parallel to the extending direction (e.g., lengthwise direction) of the first branch electrodes 194 and the second branch electrodes 196 as well as the direction substantially perpendicular to the extending direction of the first branch electrodes 194 and the second branch electrodes 196.

Accordingly, the third liquid crystal molecules 31*c* located at the boundary portion between the first branch electrodes 194 and the second branch electrodes 196 may be substantially prevented (e.g., prevented) from being inclined in the direction substantially perpendicular to the first liquid crystal molecules 31*a* and the second liquid crystal molecules 31*b* located at the position corresponding to the first branch electrodes 194 and the second branch electrodes 196, and may be inclined in the direction that the first liquid crystal molecules 31*a* and the second liquid crystal molecules 31*b* are inclined. Therefore, the irregular movement of the liquid crystal molecules generated at the boundary portion of the first subpixel electrode 191*a* and the second subpixel electrode 191*b* may be reduced (e.g., prevented), thereby reducing (e.g., preventing) the decreasing of the transmittance.

As described above, by controlling the arrangement of the ends of the first branch electrodes 194 and the second branch electrodes 196 facing each other at the boundary portion of the first subpixel electrode 191*a* and the second subpixel electrode 191*b*, the irregular movement of the liquid crystal molecules generated at the boundary portion of the first subpixel electrode 191*a* and the second subpixel electrode 191*b* may be reduced (e.g., prevented), thereby reducing (e.g., preventing) the decreasing of the transmittance.

Figure 10:
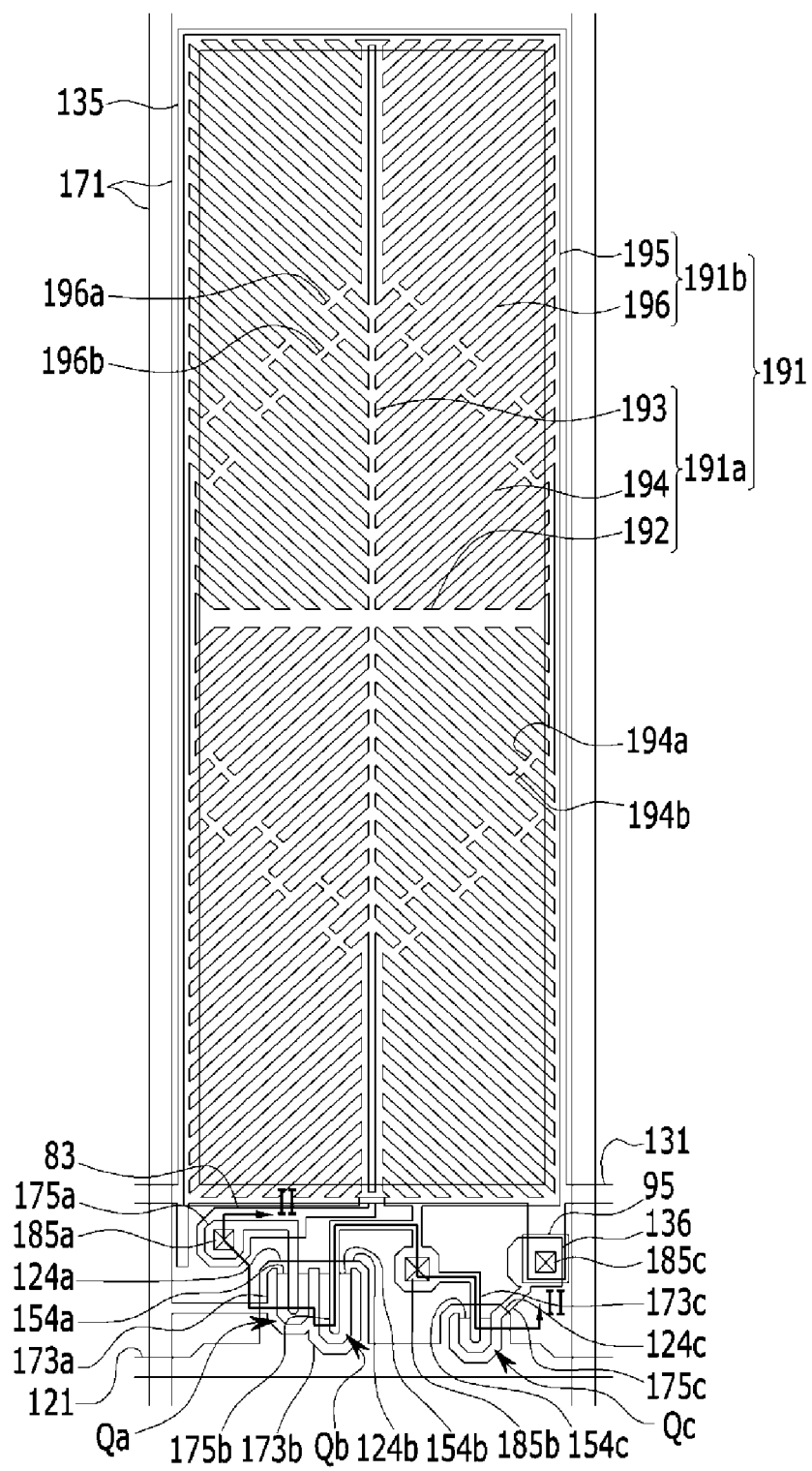
FIG. 10 is a layout view of a liquid crystal display, according to another example embodiment of the present invention.
Figure 11:
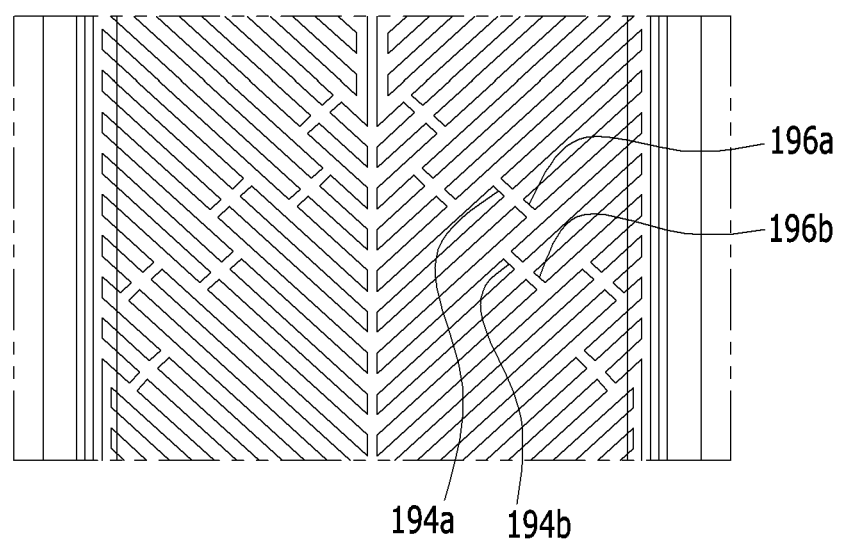
FIG. 11 is a view showing a portion of the liquid crystal display shown in FIG. 10.

Next, the liquid crystal display, according to another example embodiment of the present invention, will be described with reference to FIG. 10 and FIG. 11. FIG. 10 is a layout view of a liquid crystal display, according to another example embodiment of the present invention. FIG. 11 is a view showing a portion of the liquid crystal display shown in FIG. 10.

Referring to FIG. 10 and FIG. 11, the liquid crystal display according to the present example embodiment is almost the same as the liquid crystal display according to the example embodiment shown in FIG. 1 and FIG. 2. The detailed description for similar constituent elements may not be provided.

Referring to FIG. 10 and FIG. 11, an overall shape of the first subpixel electrode 191*a* is a polygonal shape, such as a hexagon, and the first subpixel electrode 191*a* is enclosed by the second subpixel electrode 191*b*. An overall shape of the second subpixel electrode 191*b* is a shape that includes four polygons of similar shapes surrounding the first subpixel electrode 191*a*, and is located at the edge of the pixel area.

The first subpixel electrode 191*a* includes a crossed-shape stem (192 and 193) including a transverse stem 192 and a longitudinal stem 193, and a plurality of first branch electrodes 194 extending from the crossed-shape stem (192 and 193). The first branch electrodes 194 extend in four different directions. In an embodiment, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191*b* includes an outer stem 195 enclosing the edge of the pixel area, and a plurality of second branch electrodes 196 extending from the outer stem 195. The second branch electrodes 196 extend in four different directions. In an embodiment, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

The portion of the first branch electrodes 194 and the portion of the second branch electrodes 196 face each other at a boundary portion of the first subpixel electrode 191*a* and the second subpixel electrode 191*b*.

The first branch electrodes 194 and the second branch electrodes 196 facing each other at the boundary portion of the first subpixel electrode 191*a* and the second subpixel electrode 191*b* include the third branch electrodes 194*a* having the ends protruding toward the second branch electrodes 196 and the fourth branch electrodes 194*b* having the ends that are not protruded, unlike the third branch electrodes 194*a*. Similarly, the first branch electrodes 194 and the second branch electrodes 196 facing each other at the boundary portion of the first subpixel electrode 191*a* and the second subpixel electrode 191*b* include the fifth branch electrodes 196*a* having the ends that are not protruded, unlike the first branch electrodes 194, and the sixth branch electrodes 196*b* having the ends protruding toward the first branch electrodes 194, unlike the fifth branch electrodes 196*a*.

The third branch electrodes 194*a* and the fourth branch electrodes 194*b* of the first branch electrodes 194 are alternately located two by two. For example, consecutive pairs of the third branch electrodes 194*a* are separated by a corresponding pair of the fourth branch electrodes 194*b* and/or consecutive pairs of the fourth branch electrodes 194*b* are separated by a corresponding pair of the third branch electrodes 194*a*. Similarly, the fifth branch electrodes 196*a* and the sixth branch electrodes 196*b* are alternately located two by two. For example, consecutive pairs of the fifth branch electrodes 196*a* are separated by a corresponding pair of the sixth branch electrodes 196*b* and/or consecutive pairs of the sixth branch electrodes 196b are separated by a corresponding pair of the fifth branch electrodes 196a. Two third branch electrodes 194a of the first branch electrodes 194 face two fifth branch electrodes 196a of the second branch electrodes 196, and two fourth branch electrodes 194b of the first branch electrodes 194 face two sixth branch electrodes 196b of the second branch electrodes 196. According to the present example embodiment, the third branch electrodes 194a and the fourth branch electrodes 194b of the first branch electrodes 194 are alternately located, and the fifth branch electrodes 196a of the sixth branch electrodes 196b of the second branch electrodes 196 are located two by two. However, according to another example embodiment of the present invention, three or more third branch electrodes 194a and three or more fourth branch electrodes 194b of the first branch electrodes 194 may be located, and three fifth branch electrodes 196a and three sixth branch electrodes 196b of the second branch electrodes 196 may be alternately located.

Accordingly, the ends of the first branch electrodes 194 and the second branch electrodes 196 facing each other at the boundary portion of the first subpixel electrode 191a and the second subpixel electrode 191b are not located in the straight line, and the portions located close to the side of the first branch electrodes 194 and the portions located close to the side of the second branch electrodes 196 are alternately located two by two. In an embodiment, the first branch electrodes 194 and the second branch electrodes 196 facing each other at the boundary portion of the first subpixel electrode 191a and the second subpixel electrode 191b have a sawtooth engagement with each other.

Similarly, by controlling the arrangement of the ends of the first branch electrodes 194 and the second branch electrodes 196 facing each other at the boundary portion of the first subpixel electrode 191a and the second subpixel electrode 191b, the irregular movement of the liquid crystal molecules generated at the boundary portion of the first subpixel electrode 191a and the second subpixel electrode 191b may be reduced (e.g., prevented), thereby reducing (e.g., preventing) the decreasing of the transmittance.

Figure 12:
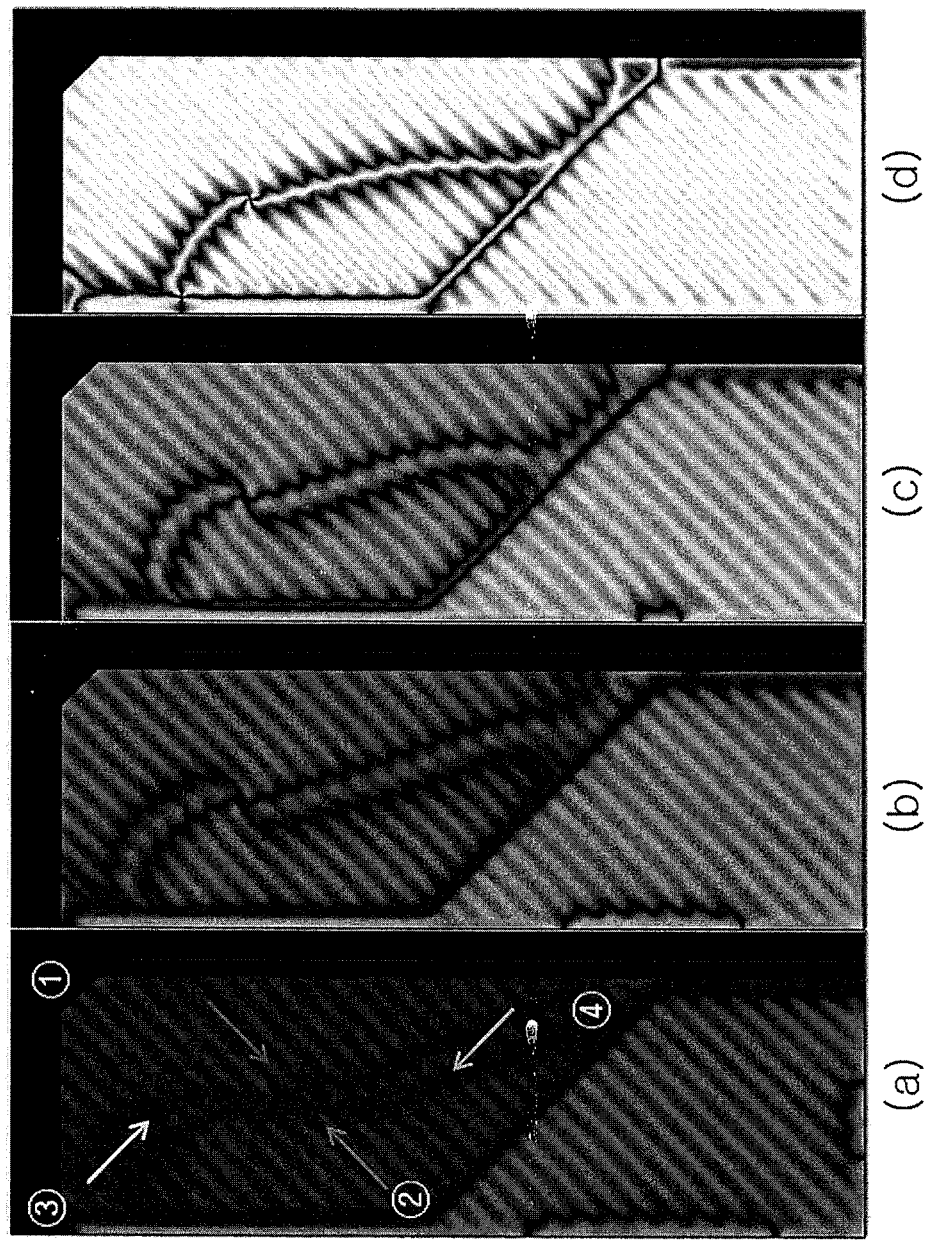
FIG. 12 and FIG. 13 are electron micrographs showing a transmittance result of liquid crystal molecules, according to another experimental example of the present invention.
Figure 13:
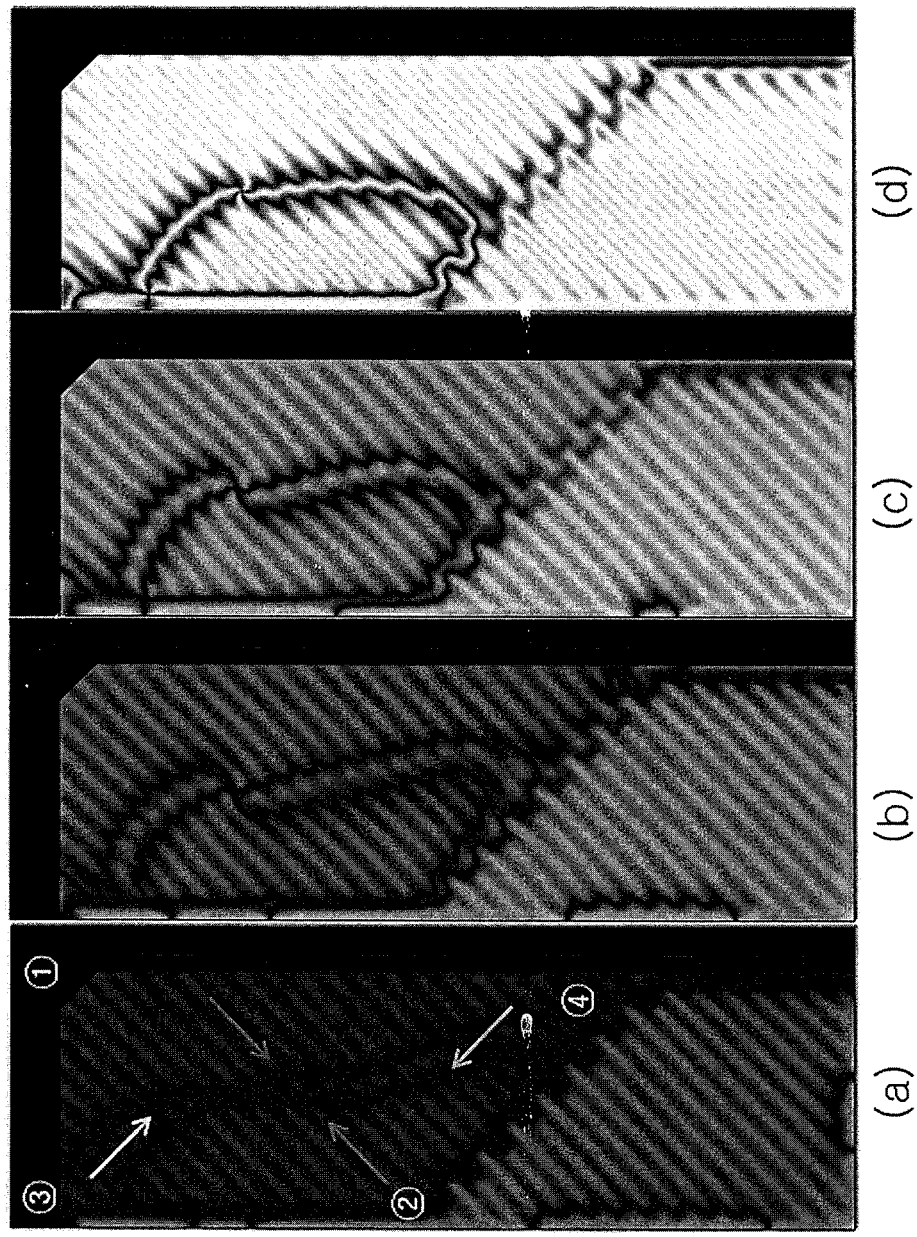

Next, a transmittance result of liquid crystal molecules, according to another experimental example of the present invention, will be described with reference to FIG. 12 and FIG. 13. FIG. 12 and FIG. 13 are electron micrographs showing a transmittance result of liquid crystal molecules, according to another experimental example of the present invention.

In the present experimental examples of FIG. 12 and FIG. 13, the transmittance change is measured while applying substantially the same voltage (e.g., the same voltage). FIG. 12 represents a first example in which the edges of the first branch electrodes 194 and the second branch electrodes 196 are located in a straight line (e.g., are aligned in a straight line) at the boundary portion between the first branch electrodes 194 and the second branch electrodes 196 similar to the related art liquid crystal display. FIG. 13 represents a second example in which the ends of the first branch electrodes 194 and the second branch electrodes 196 facing each other in the boundary portion of the first subpixel electrode 191a and the second subpixel electrode 191b are not located in a straight line (e.g., not aligned in a straight line) and the portions close to the side of the first branch electrodes 194 and the portions close to the side of the second branch electrodes 196 are alternately located similar to the liquid crystal display.

Referring to FIG. 12 and FIG. 13, when compared with the first example, in the second example, the irregular movement of the liquid crystal molecules is decreased in the boundary portion of the first subpixel electrode 191a and the second subpixel electrode 191b, such that the transmittance decrease generated in the boundary portion of the first subpixel electrode 191a and the second subpixel electrode 191b may be reduced (e.g., prevented).

Next, a transmittance result of liquid crystal molecules, according to another experimental example of the present invention, will be described with reference to FIG. 14 to FIG. 17. FIG. 14 to FIG. 17 are electron micrographs showing a transmittance result of liquid crystal molecules, according to another experimental example of the present invention.

Figure 14:
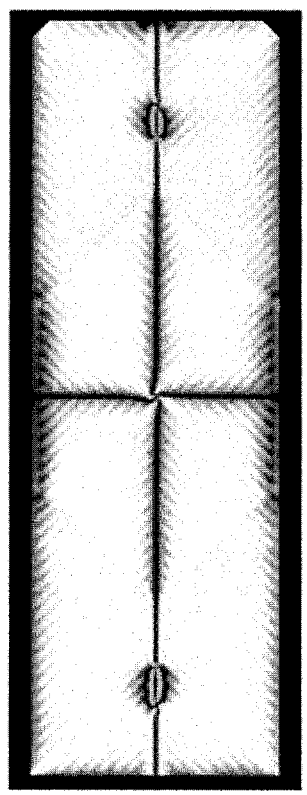
FIG. 14 to FIG. 17 are electron micrographs showing a transmittance result of liquid crystal molecules, according to another experimental example of the present invention.
Figure 14:
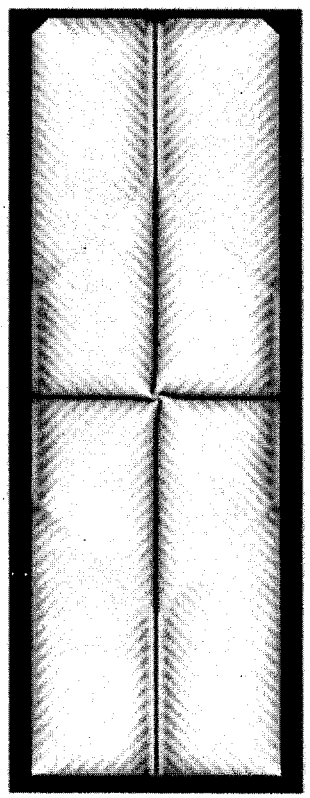
Figure 14:
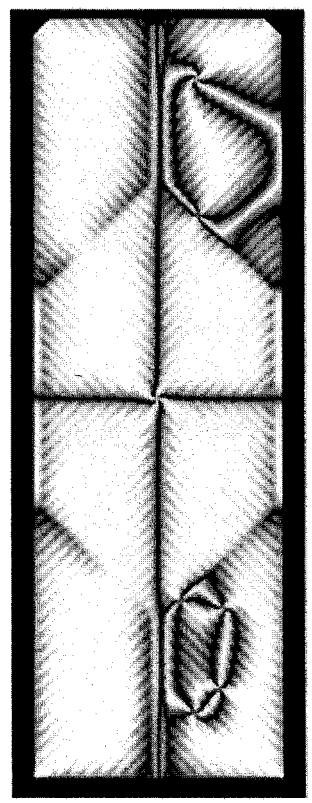
Figure 15:
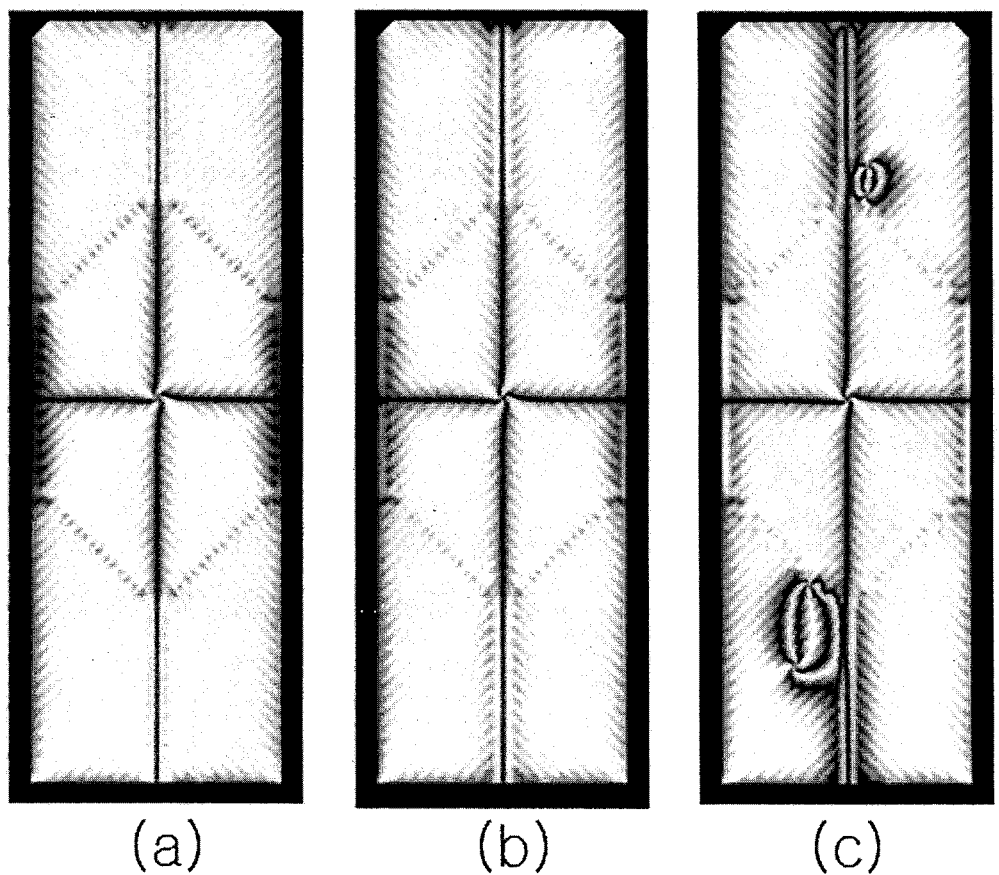

In the present experimental examples of FIG. 14 through FIG. 17, the transmittance of the pixel area is measured while a ratio of the voltage applied to the second subpixel electrode 191b for the voltage applied to the first subpixel electrode 191a is changed to about 0.7, about 0.8, and about 0.9, respectively. FIG. 14 represents a third example in which an interval of the first branch electrodes 194 and the second branch electrodes 196 is formed at about 4 μm in the boundary portion between the first branch electrodes 194 and the second branch electrodes 196, and the edges of the first branch electrodes 194 and the second branch electrodes 196 are located in the straight line (e.g., aligned in a straight line) in the boundary portion of the first branch electrodes 194 and the second branch electrodes 196, similar to the related art liquid crystal display. FIG. 15 represents a fourth example in which the interval of the first branch electrodes 194 and the second branch electrodes 196 is formed at about 4 μm in the boundary portion between the first branch electrodes 194 and the second branch electrodes 196, and the portions close to the side of the first branch electrodes 194 and the portions close to the side of the second branch electrodes 196 are alternately located, similar to the liquid crystal display according to an example embodiment of the present invention.

Figure 16:
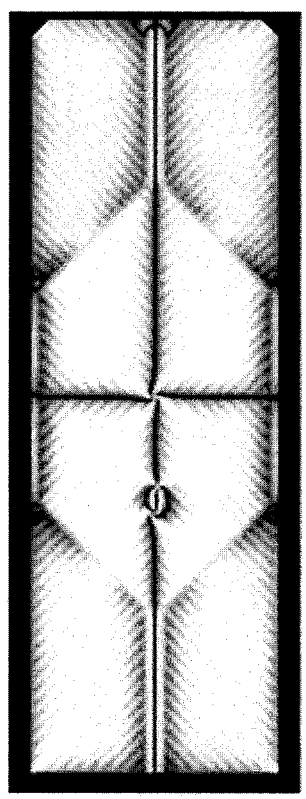
Figure 16:
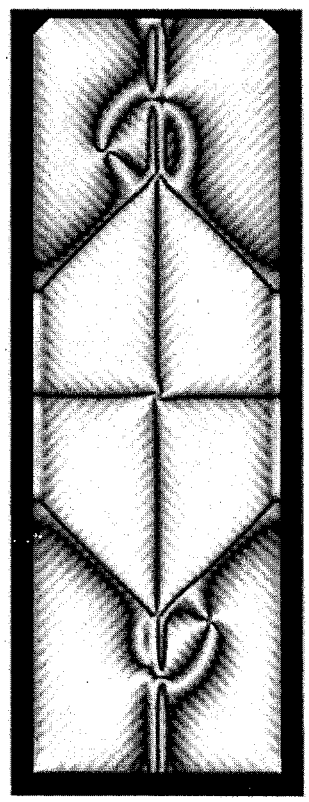
Figure 16:
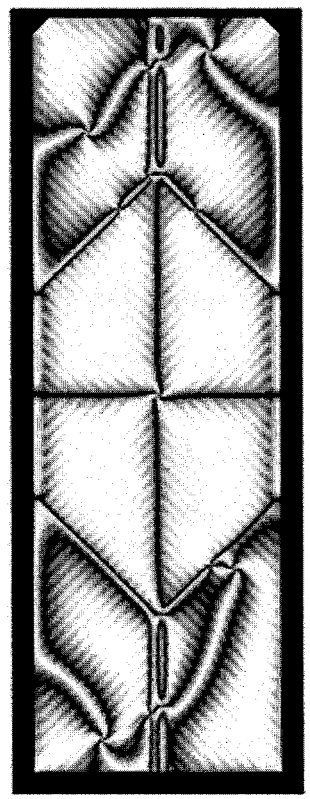
Figure 17:
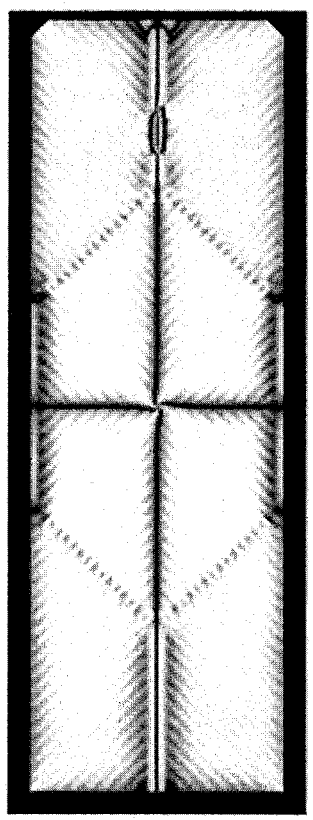
Figure 17:
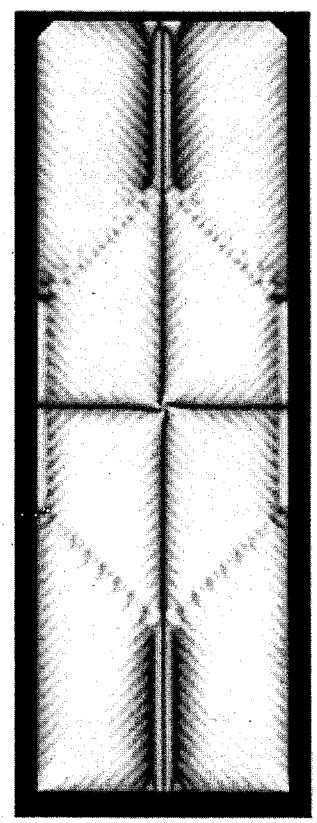
Figure 17:
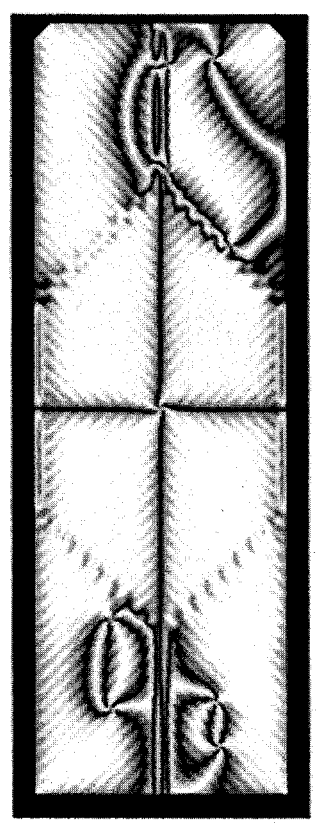

FIG. 16 represents a fifth example in which the interval of the first branch electrodes 194 and the second branch electrodes 196 is formed at about 5 μm in the boundary portion between the first branch electrodes 194 and the second branch electrodes 196 and the edges of the first branch electrodes 194, and the second branch electrodes 196 are located in the straight line in the boundary portion of the first branch electrodes 194 and the second branch electrodes 196, similar to the related art liquid crystal display FIG. 17 represents a sixth example in which the interval of the first branch electrodes 194 and the second branch electrodes 196 is formed at about 5 μm in the boundary portion between the first branch electrodes 194, and the second branch electrodes 196 and the portions close to the side of the first branch electrodes 194 and the portions close to the side of the second branch electrodes 196 are alternately located, similar to the liquid crystal display according to an example embodiment of the present invention.

FIG. 14 is the result of the third example, where (a) is the result when the ratio of the voltage applied to the second subpixel electrode 191b to the voltage applied to the first subpixel electrode 191a is about 0.7, (b) is the result when the ratio of the voltage applied to the second subpixel electrode 191b to the voltage applied to the first subpixel electrode 191a is 0.8, and (c) is the result when the ratio of the voltage applied to the second subpixel electrode 191b to the voltage applied to the first subpixel electrode 191a is 0.9.

FIG. 15 is the result of the fourth example, where (a) is the result when the ratio of the voltage applied to the second subpixel electrode 191b to the voltage applied to the first subpixel electrode 191a is about 0.7, (b) is the result when the ratio of the voltage applied to the second subpixel electrode 191b to the voltage applied to the first subpixel electrode 191a is 0.8, and (c) is the result when the ratio of the voltage applied to the second subpixel electrode 191b to the voltage applied to the first subpixel electrode 191a is 0.9.

FIG. 16 is the result of the fifth example, where (a) is the result when the ratio of the voltage applied to the second subpixel electrode 191b to the voltage applied to the first subpixel electrode 191a is about 0.7, (b) is the result when the ratio of the voltage applied to the second subpixel electrode 191b to the voltage applied to the first subpixel electrode 191a is 0.8, and (c) is the result when the ratio of the voltage applied to the second subpixel electrode 191b to the voltage applied to the first subpixel electrode 191a is 0.9.

FIG. 17 is the result of the sixth example, where (a) is the result when the ratio of the voltage applied to the second subpixel electrode 191b to the voltage applied to the first subpixel electrode 191a is about 0.7, (b) is the result when the ratio of the voltage applied to the second subpixel electrode 191b to the voltage applied to the first subpixel electrode 191a is 0.8, and (c) is the result when the ratio of the voltage applied to the second subpixel electrode 191b to the voltage applied to the first subpixel electrode 191a is 0.9.

Referring to FIG. 14 and FIG. 15, when compared with the third example, in the fourth example, the irregular movement of the liquid crystal molecules is decreased in the boundary portion of the first subpixel electrode 191a and the second subpixel electrode 191b such that the transmittance decrease generated in the boundary portion of the first subpixel electrode 191a and the second subpixel electrode 191b may be reduced (e.g., prevented).

Also, referring to FIG. 16 and FIG. 17, when compared with the fifth example, in the sixth example, the irregular movement of the liquid crystal molecules is decreased in the boundary portion of the first subpixel electrode 191a and the second subpixel electrode 191b such that the transmittance decrease generated in the boundary portion of the first subpixel electrode 191a and the second subpixel electrode 191b may be reduced (e.g., prevented).

That is, for all cases in which the interval of the first branch electrodes 194 and the second branch electrodes 196 is formed at about 4 μm or about 5 μm in the boundary portion between the first branch electrodes 194 and the second branch electrodes 196, according to an example embodiment of the present invention, the irregular movement of the liquid crystal molecules is decreased in the boundary portion of the first subpixel electrode 191a and the second subpixel electrode 191b such that the transmittance decrease generated in the boundary portion of the first subpixel electrode 191a and the second subpixel electrode 191b may be reduced (e.g., prevented). Furthermore, according to an example embodiment of the present invention, although the interval of the first branch electrodes 194 and the second branch electrodes 196 is widened in the boundary portion between the first branch electrodes 194 and the second branch electrodes 196, when the difference of the voltages applied to the first subpixel electrode and the second subpixel electrode is small, the movement of the liquid crystal molecules may be controlled (e.g., easily controlled) in the boundary portion between the first branch electrodes 194 and the second branch electrodes 196.

As described above, according to an example embodiment of the present invention, by controlling the arrangement of the ends of the first subpixel electrode 191a and the second subpixel electrode 191b facing each other in the boundary portion of the first branch electrodes 194 and the second branch electrodes 196, the irregular movement of the liquid crystal molecules generated in the boundary portion of the first subpixel electrode 191a and the second subpixel electrode 191b may be reduced (e.g., prevented), thereby reducing (e.g., preventing) the reduction of the transmittance.

While this invention has been described in connection with what is presently considered to be practical example embodiments, it is to be understood that the invention is not limited to the disclosed embodiments, but, on the contrary, is intended to cover various suitable modifications and equivalent arrangements included within the spirit and scope of the appended claims, and equivalents thereof.

What is claimed is:

1. A liquid crystal display comprising: a first substrate; a pixel electrode on the first substrate and comprising a first subpixel electrode and a second subpixel electrode separated from each other and located in one pixel area; a second substrate facing the first substrate; a common electrode on the second substrate; and a liquid crystal layer between the first substrate and the second substrate, wherein the first subpixel electrode comprises a plurality of first branch electrodes and the second subpixel electrode comprises a plurality of second branch electrodes, wherein the second subpixel electrode is located around the pixel area to enclose four or more sides of the first subpixel electrode and a first voltage to be applied to the first subpixel electrode is higher than a second voltage to be applied to the second subpixel electrode, wherein the plurality of first branch electrodes and the plurality of second branch electrodes face each other in a boundary portion of the first subpixel electrode and the second subpixel electrode, wherein, in the boundary portion, the plurality of first branch electrodes comprise a third branch electrode protruding toward the second branch electrode and a fourth branch electrode not protruded toward the second branch electrode, the fourth branch electrode comprising two extension electrodes adjacent to and at opposing sides of an extension of the third branch electrode and shorter in length than the extension of the third branch electrode, and wherein, in the boundary portion, the plurality of second branch electrodes comprise a fifth branch electrode not protruded toward the first branch electrode and a sixth branch electrode protruding toward the first branch electrode.

2. The liquid crystal display of claim 1, wherein
the third branch electrode faces the fifth branch electrode, and
the fourth branch electrode faces the sixth branch electrode.

3. The liquid crystal display of claim 2, wherein
the third branch electrode and the fourth branch electrode are alternately arranged, and
the fifth branch electrode and the sixth branch electrode are alternately arranged.

4. The liquid crystal display of claim 3, wherein
the third branch electrode and the fourth branch electrode are alternately arranged one by one, and
the fifth branch electrode and the sixth branch electrode are alternately arranged one by one.

5. The liquid crystal display of claim 4, wherein
the first voltage is higher than the second voltage,
the shape of the first subpixel electrode is a polygonal shape, and
the shape of the second subpixel electrode comprises four polygons enclosing the first subpixel electrode.

6. The liquid crystal display of claim 5, wherein the polygonal shape is a hexagon.

7. The liquid crystal display of claim 5, wherein:
the first subpixel electrode further comprises a cross stem comprising a transverse stem and a longitudinal stem; and
the plurality of first branch electrodes extend in four different directions from the cross stem.

8. The liquid crystal display of claim 7, wherein the second subpixel electrode further comprises an outer stem located around the pixel area, and
the plurality of second branch electrodes extend in four different directions from the outer stem.

9. The liquid crystal display of claim 3, wherein the third branch electrode and the fourth branch electrode are alternately arranged in twos or more, and
the fifth branch electrode and the sixth branch electrode are alternately arranged in twos or more.

10. The liquid crystal display of claim 9, wherein the first voltage is higher than the second voltage, the shape of the first subpixel electrode is a polygonal shape, and
the second subpixel electrode comprises four polygons enclosing the first subpixel electrode.

11. The liquid crystal display of claim 10, wherein the polygonal shape is a hexagon.

12. The liquid crystal display of claim 9, wherein:
the first subpixel electrode further comprises a cross stem comprising a transverse stem and a longitudinal stem; and
the plurality of first branch electrodes extend in four different directions from the cross stem.

13. The liquid crystal display of claim 12, wherein:
the second subpixel electrode further comprises an outer stem located around the pixel area; and
the plurality of second branch electrodes extend in four different directions from the outer stem.

* * * * *